March 1, 1966     C. W. SKARSTROM     3,237,377
OXYGEN CONCENTRATION PROCESS
Filed April 12, 1962
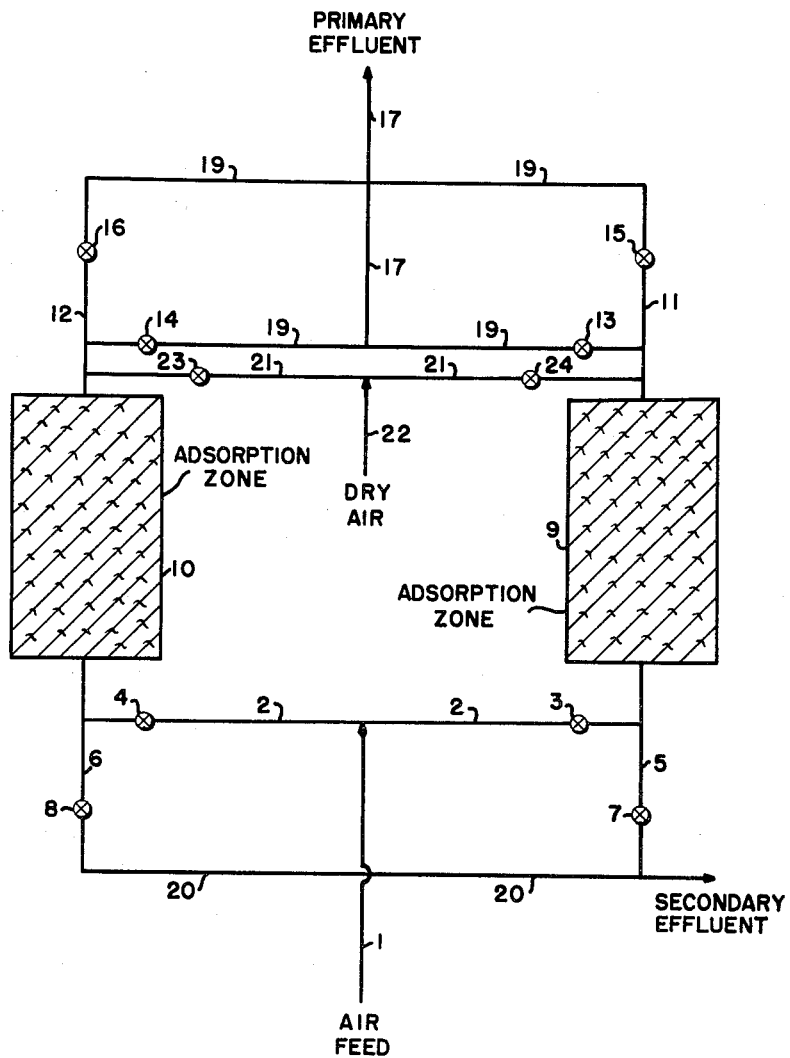
Charles W. Skarstrom    Inventor
By Robert J. Pearlman
Patent Attorney United States Patent Office 3,237,377
Patented Mar. 1, 1966

3,237,377
OXYGEN CONCENTRATION PROCESS
Charles W. Skarstrom, Montvale, N.J., assignor to Esso Research and Engineering Company, a corporation of Delaware
Filed Apr. 12, 1962, Ser. No. 186,966
2 Claims. (Cl. 55—25)

The present invention is concerned with an improved method for increasing the oxygen content of air. More particularly, the present invention is concerned with an improved method for increasing the oxygen content of air using the heatless fractionation technique. More particularly, the present invention is concerned with an improved method of increasing the oxygen content of air using the heatless fractionation technique wherein the adsorption zone is purged with dry air at the end of the adsorption portion of the cycle to increase the recovery of oxygen.

A method and apparatus for increasing the oxygen content of air using the heatless fractionation technique is set out in considerable detail in U.S. Patent 2,944,627 in which the inventor is Charles W. Skarstrom. As described in said patent, as well as in subsequent publications and particularly as applied to the separation of oxygen from air, the heatless fractionation system includes the features of adsorption at an elevated pressure, desorption at a reduced pressure, carrying out said adsorption step for a time substantially short of saturation of the bed with the adsorbed component (nitrogen), desorbing said bed short of complete removal of said adsorbed component, and relatively rapid cycling, e.g. cycle periods of less than 30 minutes, preferably under 10 minutes and especially 4 to 0.1 minutes. The use of such features permits a highly effective fractionation without necessitating the addition of externally supplied heat.

As shown in the above-identified U.S. patent, the heatless fractionation technique there described utilizes a portion of the primary effluent to purge the adsorption zones at the end of the adsorption portion of the cycle. This results in a considerably reduced total recovery of the primary effluent stream (which in the present invention is an oxygen concentrated air stream) since a portion thereof is recycled.

It is thus an object of the present invention to provide an improved method using the heatless fractionation technique to increase the recovery of the oxygen in the air feed stream and thus bring about a considerable economic saving.

In the present invention the oxygen content of an air feed stream is increased to an oxygen concentration of 22 to 60% (all oxygen concentrations used herein are based upon volume percent of the total amount of air), especially 25 to 35%, and particularly about 30 volume percent. The uses of an oxygen enriched air stream, particularly one at about the 30 volume percent oxygen concentration level, are widely known. For instance, blast furnaces utilize oxygen enriched air streams at about the 30% oxygen concentration level. It has now been found that, when increasing the oxygen content of air using the heatless fractionation tetchnique, the adsorbent in the adsorption zone can be purged with dry air (dew point lower than that of atmospheric air) at the end of the adsorption portion of the cycle without harming the effectiveness of the fractionation. This results in a substantial increase in oxygen recovery, based on the volume percent of oxygen in the feed, since no enriched product needs to be used for desorption. The dry air used as purge is normally at substantially ambient temperature, e.g. 0° to 150° F., preferably 30° to 100° F.

In a preferred embodiment the use of dry air rather than product gas for desorption is coupled with a pressure equalization step between adsorption and desorption zones. Instead of discharging the adsorption zone immediately to the low pressures of desorption, the adsorption zone is dumped to an intetrmediate pressure by connecting it to a low pressure zone which is under desorption pressure. After pressure equalization of the two zones by connecting their product ends, the spent adsorption zone is further reduced in pressure to reach desorption conditions. The fresh adsorption bed just off desorption, which has thus been partially repressured by equalization, is then pressured up to adsorption conditions, fresh feed preferably being used for the completion of the repressuring of the bed. Since the average composition of the gases from the adsorption zone during pressure equalization is richer than the feed composition, it is superior to feed for partial repressuring the bed coming off desorption and about to be put on to the adsorption cycle. Increased oxygen recovery is realized since some of the enriched air in the adsorption front is thus salvaged.

The attached drawing is a schematic flow diagram of the oxygen concentration process wherein dry air is used to purge the adsorbent.

Referring now to the drawing in more detail, numeral 1 designates the air feed stream introduced into adsorption zone 9. In this description adsorption zone 9 will be initially on the adsorption portion of the cycle and adsorption zone 10 on the desorption portion of the cycle. Thus initially valves 3, 15, 8, and 23 are open and valves 7, 13, 24, 4, 14, and 16 are closed. The air feed stream line 1 passes into header 2 through valve 3 into line 5 and into adsorption zone 9 which is packed with an adsorbent selective for nitrogen. In general, adsorbents which are selective for nitrogen, and both adsorb and desorb nitrogen readily, are preferred. Suitable adsorbents which are selective for nitrogen and are suitable for use in increasing the oxygen content of air are X-type molecular sieves (sold by the Linde Co.), i.e. synthetic sodium or calcium alumino-silicate zeolites, e.g. 13X, 10X, etc., having adsorptive affinity for nitrogen. Other suitable adsorbents, particularly for room temperature operations, are synthetic calcium alumino-silicate zeolites having an average pore diameter of 5 Angstroms. The primary effluent, which is an air stream containing oxygen in the concentration of about 30 volume percent, passes through line 11, valve 15, into header 19 and out through line 17 where it may be stored or immediately used.

The temperature of adsorption zone 9 can be that of the ambient air stream since in normal operations this adsorption zone 9 has a temperature in the range of from about 0° to 150° F., e.g. 30° to 100° F. The term "ambient" denotes atmospheric or room temperature.

The pressure in adsorption zone 9 during the adsorption portion of the cycle is normally in the range of from 0 to 200 p.s.i.g., the preferred pressure being about 30 p.s.i.g. In special applications, such as producing feed for high or low pressure reactions, other pressures may be employed. A 30 p.s.i.g. adsorption pressure is preferred since many uses of oxygen concentrated air require a pressure of about 30 p.s.i.g., e.g. blast furnace applications. Thus, additional compression is unnecessary since the primary effluent stream is at the desired pressure.

Adsorption zone 10, which is on the desorption portion of the cycle, is desorbed in the following manner. Initially when adsorption zone 10 goes on the desorption portion of the cycle it is preferably first brought into pressure equilibrium with adsorption zone 9 (then on desorption) to reduce the losses of the oxygen enriched air. This is done by opening valves 14 and 13 while shutting off line 17. Thus, if at the end of the adsorption of the cycle adsorption zone 10 is at 30 p.s.i.g. and adsorption zone 9 has been desorbed at about 0 p.s.i.g., then the equilibrium pressure between the two zones is about 15 p.s.i.g. It should be noted that the concentration of the oxygen in the stream flowing from adsorption zone 10 into zone 9 decreases as the pressure in zone 10 diminishes to the equilibrium pressure between the two zones. Thus, at an equilibrium pressure of about 15 p.s.i.g. the oxygen concentration is about 21 volume percent. At pressures lower than 15 p.s.i.g. the oxygen concentration in the forward effluent from zone 10 decreases below that of the concentration of oxygen in air so that no additional benefit is derived from using an equilibrium pressure below that of 15 p.s.i.g., when making a 30% $O_2$ product at 30 p.s.i.g.

With other combinations of $O_2$ enrichment and other working pressures, it is desirable to use a higher or lower equilibrium pressure. This is determined by the composition of the primary effluent during the pressure equalization step. As soon as its $O_2$ content drops below that in air, no additional benefit is derived by further fluid communication between zones 9 and 10.

After the pressure equalization, adsorption zone 10 is ready to go on the desorption portion of the cycle. The desorption of adsorption zone 10 is carried out by opening valve 8. Desorbate is removed from adsorption zone 10 by placing a vacuum on adsorption zone 10, or simply discharging to any lower pressure zone such as the atmosphere. At this reduced pressure desorbate flows from adsorption zone 10 through line 6, valve 8, header 20 and is removed as secondary effluent. In the present example, it is discharged to the atmosphere which is at 0 p.s.i.g.

Following this blowdown procedure, adsorption zone 10 is purged with dry air at about 0 p.s.i.g. through line 22, line 21, valve 23, line 12, into adsorption zone 10, and out through line 6, valve 8 and header 20 where it is removed as secondary effluent.

In the event that adsorption zone 10 is evacuated to a pressure lower than atmospheric pressure, adsorption zone 10 can be purged as previously described with dry air at this low desorption pressure.

In order that moisture and $CO_2$ do not accumulate in the adsorption zones 9 and 10, the dry air used to urge adsorption zone 10 must have a very low dew point, i.e. a dew point of less than 0° F., preferably less than —200° F. Dry $CO_2$ free air with no measurable dew point at —300° F. has been found particularly satisfactory. The dry air may be the product of a heatless drying operation such as described in the Skarstrom Patent, U.S. 2,944,627.

Extremely dry air is used in this purge operation since 13X molecular sieves have an extremely high selectivity for water. As a result, the introduction of water to the adsorbent during the purge operation results in a situation wherein the water is never removed from the adsorbent in adsorption zone 9 or 10. By experience, it has been found that the sieves in 9 and 10 can be brought to a satisfactory initial condition of dryness by heating to 500° F. while purging with dry air purge. Thereafter, the beds remain in good condition to concentrate $O_2$, and are then used to practice the present invention.

The present invention thus contemplates that a "wet" air feed stream can be used and by using an extremely dry air stream to purge the adsorption zones, the water concentration on the adsorbent remains at a satisfactory low level to process the air stream for $O_2$ enrichment. The actual volume (at pressures in vessel at time gas passes through) of dry air required to purge the adsorbent is in the range of 0.1 to 10, preferably 1 to 3, times the actual volume of product. In the present example utilizing 13X sieves at room temperatures, the purge volume was 2.5 times the actual volume of product when making 30% $O_2$ at 30 p.s.i.g. In general, the proper purge volume can be found by adjustment of purge volume per cycle until the maximum $O_2$ concentration in product for a given product rate is achieved.

After the adsorbent is purged with dry air, valves 8 and 23 are closed.

As previously described, adsorption zone 9 is put in pressure equilibrium with adsorption zone 10 by opening valves 23 and 24 while line 22 is shut off. After the pressure equalization step is complete, valve 4 is opened and valve 23 is closed to allow the pressure to build up in zone 10 via flow of the feed stream in line 1 through line 2, valve 4, line 6, adsorption zone 10 and line 12. After pressure build-up in zone 10 to the feed pressure, valve 16 is opened and primary effluent flows out through lines 19 and 17. Adsorption zone 9 is then desorbed as previously described with reference to adsorption zone 10.

With regard to the present specific embodiment, two 4 inch by 6 foot beds (0.5 cubic feet each) containing 45 lbs. total of adsorbent 13X molecular sieves were employed utilizing a two minute total adsorption cycle. It comprised a 30 second adsorption step, a 15 second pressure equalization step, 15 second rest period at equalization pressure, 5 seconds for further depressuring (blowdown), 25 second period for desorbing with dry air and 15 seconds for pressure equalization and then repressuring for 15 seconds to final adsorption pressure.

Atmospheric air at a feed rate of 3.8 s.c.f. per minute was passed to the adsorption zones and enriched product air containing 31 volume percent oxygen was taken overhead at a rate of 2.4 s.c.f. per minute. As indicated previously, adsorption was conducted at 30 p.s.ig. and desorption at 0 p.s.i.g. Temperature of the bed was approximately 70° F. In accordance with the present invention, during desorption 1.2 s.c.f. per minute of dry air having no measurable dew point at —200° F. (but containing trace quantities of carbon dioxide) was employed to desorb and thus regenerate the bed. A pressure equalization step was employed as previously described. Oxygen recoveries of 82% based on feed were obtained.

By way of comparison the same adsorption zones and adsorption cycle periods and pressures were employed in treating an air stream with the beds being desorbed by the use of a portion of the product gas (enriched air). Bed pressure equalization was employed in the same manner and a product of 31% oxygen recovered. In this operation 5 s.c.f. per minute of air feed was utilized with a product of enriched air being recovered at a rate of 2.06 s.c.f. per minute. This represents an oxygen recovery of 59% based on feed, nearly 30% less than that which was obtained by the practice of the present invention, thus evidencing the substantial advantages offered by the latter.

In summary, then, the present invention utilizes an extremely dry air stream to purge the adsorbent and thus, increases the recovery of oxygen from the air feed stream. This is preferably accompanied by pressure equalization before dump so as to save partially enriched air.

Various modifications may be made to the present process. For example, a heatless fractionation system for oxygen recovery may be coupled with a heatless fractionation system for drying air in order to supply dry air for desorbing the oxygen fractionation beds. Alternatively, an adsorption zone having a section designed for drying air and another section designed for oxygen fractionation (appropriate choice of adsorbers, piping, etc.) may be employed, the drying air produced by the first section serving to regenerate the second section. It is noted that where continuous product flow is essential and pressure equalization is to be employed, two pairs or more of beds working in opposite phases would be employed.

Moreover, while pressure equalization of the two zones prior to instituting desorption is preferred, the present process may find application wherein the adsorption zone is reduced to the relatively low pressure of desorption by other means such as, for example, pressure equalization with a reservoir zone which does not contain adsorbent, immediate depressuring to low desorption pressure, etc.

At higher $O_2$ enrichments (>30%) further forward blowdown (initially depressured gas) which has an $O_2$ concentration of >21% can be put back into the compressor for feed intake rather than simply discharged.

Having described the present invention, that which is sought to be protected is set forth in the following claims.

What is claimed is:

1. In a heatless fractionation process for increasing the concentration of oxygen in a feed air stream by flowing an air stream into an adsorption zone wherein a bed of adsorbent selectively adsorbs nitrogen, moisture, and $CO_2$ components from said air stream at a relatively high pressure of about 30 p.s.i.g. up to 200 p.s.i.g. during an adsorption step and withdrawing from said zone a product stream of remaining unadsorbed components of the air thus having substantially increased oxygen concentration, said adsorption step being carried out for a time substantially short of saturation of the adsorbent by adsorbed components then being followed by a desorption of the adsorbed components at a relatively low pressure short of complete removal of the adsorbed components, the steps of adsorption and desorption being carried out in a rapid manner that eliminates need for addition of externally supplied heat, so that the zone is at ambient atmospheric temperatures, the improvement which comprises purging desorbed components from the bed of adsorbent at said relatively low pressure with dry air having a dew point less than 0° F. and having a nitrogen-to-oxygen mole ratio the same as atmospheric air in said feed stream said dry air being made to flow in a reverse direction from that of the air stream in the adsorption step, and the further improvement wherein said adsorption zone is depressured by putting it into fluid communication with a second adsorption zone which has had desorbed components purged by the dry air so that gas flows from the first adsorption zone into said second adsorption zone, then further depressuring said first adsorption zone to said relatively low pressure under which said purging with the dry air is effected.

2. The improvement defined in claim 1, wherein the relatively high pressure in the adsorption zone is about 30 p.s.i.g., the relative low pressure in said zone during the purging is about atmospheric pressure, the dry air used for the purging has a dew point below —200° F., and the oxygen concentration of the product stream is about 30 volume percent.

References Cited by the Applicant

UNITED STATES PATENTS

| 2,535,902 | 12/1950 | Dailey | 55—33 |
|---|---|---|---|
| 2,699,837 | 1/1955 | Van Note | 55—62 |
| 2,835,115 | 5/1958 | Karwat | 55—62 |
| 2,893,512 | 7/1959 | Armond | 55—58 |
| 2,944,627 | 7/1960 | Skarstrom | 55—62 |
| 2,966,531 | 12/1960 | Louis | 55—75 |
| 2,995,208 | 8/1961 | Hackmuth et al. | 55—62 X |
| 3,024,868 | 3/1962 | Milton | 55—73 X |
| 3,037,338 | 6/1962 | Thomas | 55—75 |
| 3,069,830 | 12/1962 | Skarstrom et al. | 55—58 |
| 3,085,379 | 4/1963 | Kiyonaga et al. | 55—62 |
| 3,094,569 | 6/1963 | Thomas | 55—75 X |
| 3,140,931 | 7/1964 | McRobbie | 55—75 X |
| 3,140,932 | 7/1964 | McKee | 55—68 |
| 3,141,748 | 7/1964 | Hoke et al. | 55—25 |

FOREIGN PATENTS

| 365,092 | 1/1932 | Great Britain. |
|---|---|---|
| 850,443 | 10/1960 | Great Britain. |
| 860,311 | 2/1961 | Great Britain. |

OTHER REFERENCES

Industrol Dynamic Dehumidifiers, Technical Bulletin Number 6551, Industrol Corporation, 472 Westerfield Ave., East Roselle Park, New Jersey, 2 pp.

Nemmers, R. J.: "Low Dew-Point Compressed Air," Compressed Air Magazine, September 1959, pages 10–13.

REUBEN FRIEDMAN, *Primary Examiner.*